(12) United States Patent
Catelli et al.

(10) Patent No.: US 7,943,256 B2
(45) Date of Patent: May 17, 2011

(54) METHOD FOR PRODUCING BATTERY ELECTRODES, ELECTRODES PRODUCED BY THIS METHOD, AND BATTERIES CONTAINING SUCH ELECTRODES

(75) Inventors: Cesare Catelli, Uggiate Trevano (IT); Pascal Häring, Aesch (CH)

(73) Assignees: P.C. Di Pompeo Catelli, Uggiate Trevano (CO) (IT); Oerlikon Stationar-Batterien AG Aesch BL, Aesch (CH)

( * ) Notice: Subject to any disclaimer, the term of this patent is extended or adjusted under 35 U.S.C. 154(b) by 172 days.

(21) Appl. No.: 12/303,816

(22) PCT Filed: Oct. 17, 2006

(86) PCT No.: PCT/EP2006/009995
§ 371 (c)(1),
(2), (4) Date: Dec. 8, 2008

(87) PCT Pub. No.: WO2007/147429
PCT Pub. Date: Dec. 27, 2007

(65) Prior Publication Data
US 2009/0261292 A1    Oct. 22, 2009

(30) Foreign Application Priority Data
Jun. 23, 2006  (IT) .............................. BG2006A0033

(51) Int. Cl.
*H01M 10/00*    (2006.01)

(52) U.S. Cl. ................ 429/228; 423/619; 423/98; 29/2; 205/63

(58) Field of Classification Search ................... 423/619, 423/98; 429/228, 205; 29/2; 205/63
See application file for complete search history.

(56) References Cited

U.S. PATENT DOCUMENTS

| 4,388,210 A | * | 6/1983 | Parker ........................ 252/182.1 |
| 4,656,706 A | | 4/1987 | Mahato et al. |
| 5,149,606 A | | 9/1992 | Bullock et al. |
| 5,290,359 A | | 3/1994 | Coonen et al. |

FOREIGN PATENT DOCUMENTS

JP            60-157161          8/1985

OTHER PUBLICATIONS

Patent Abstracts of Japan of JP 60-157161 dated Aug. 17, 1985.

\* cited by examiner

*Primary Examiner* — Steven Bos
(74) *Attorney, Agent, or Firm* — Ladas & Parry LLP

(57) ABSTRACT

A method for producing at least one lead battery electrode, comprising the step of disposing an active paste on a support in such a manner as to form said electrode, and locating said electrode in a controlled atmosphere environment to expose said electrode to a gas enriched in ozone, characterised in that said electrode is exposed to an ozone-enriched gas of flow rate less than 100 liters per hour for each square meter of surface of said electrode.

8 Claims, No Drawings

METHOD FOR PRODUCING BATTERY ELECTRODES, ELECTRODES PRODUCED BY THIS METHOD, AND BATTERIES CONTAINING SUCH ELECTRODES

The present invention relates to a method for producing battery electrodes, electrodes produced by this method, and batteries containing such electrodes, in accordance with the introduction to the main claims.

Batteries used for example for uninterruptible power supplies are generally formed from a plurality of cells comprising in their interior a positive electrode and a negative electrode, which are in the form of two facing plates. Between the two electrodes an electrolyte (sulphuric acid) is present together with a microporous separator to enable the ions and charges to move freely. These electrodes present an internal structure formed from a support, generally a lead grid, for current conduction. The support grid can be formed in various ways, for example gravity cast, continuously cast on a drum, expanded from a lead strip or perforated by means of suitable equipment. An active paste consisting of a mixture of lead, lead oxide, sulphuric acid, water and certain additives is spread onto this support grid. The active paste mix is prepared by a suitable industrial mixer, to obtain good density, wetness, porosity and consistency characteristics. This paste is suitably spread onto the grid by a spreading machine, the properties of the active paste enabling it to properly fill the grid holes and to adhere to the grid surface.

After the spreading operation the plates are pressed to improve contact between the active paste and the grid surface.

The plates are then inserted into a rapid drying oven to reduce the moisture content of the active paste. This rapid drying process also triggers an exothermic reaction with formation of lead oxide and lead hydroxide, in addition to other compounds, which heats the plate and induces changes in the structure of the active paste mass.

The plates are then subjected to a curing operation in suitable chambers, during which oxidation of the lead present in the active paste is completed, at the end of this process this latter solidifying to become active material. The plates are generally disposed side by side for curing. As the lead reaction is exothermic, once triggered during the rapid drying process it proceeds until lead oxidation is complete, or until the oxygen and the water from which the oxygen is obtained are exhausted. This reaction is triggered in any event, even in the absence of rapid oven drying, however the presence of an excessive water quantity in the mix would result in too lengthy a curing time.

The temperature and drying pattern also determine which lead sulphates are present in the current plates, and the structure and hardness of the active material. If the reaction stops for lack of water, the structure of the material surrounding the lead particles undergoes an irreversible change and the reaction cannot be reactivated even by again wetting the plate.

EP 228 647 describes a method for electrical conductivity of the electrodes, consisting of exposing the plates to an ozone enriched gas to convert the thin outer layer into lead dioxide. Specifically, it applies a gas flow containing 3% of ozone at a rate of 1.6 cubic feet per square foot of plates per hour. This equals a gas flow of 485 $l/m^2$, hence containing 16 $g/m^2$ of ozone.

An object of the present invention is therefore to provide a process enabling a particular structure and chemical composition to be created on the plate surface.

Another object is to increase the battery capacity.

Another object is to save energy.

Another object is to reduce the time required for the battery formation process.

A further object of the invention is to provide electrodes and batteries with improved properties compared with the known art.

Said objects are attained by a method, by electrodes and by a battery the characteristics of which are defined in the claims.

The Applicants have surprisingly found that a lesser gas flow (and hence a lesser ozone quantity) produce a change in the plates such as to obtain a better plate efficiency than plates of the known art, obtained with larger flows.

By reducing the use of ozone and obtaining a better battery efficiency, a considerable production-cost reduction is obtained, with lower production process risks.

The characteristics and advantages of the present invention will be apparent from the ensuing description of one embodiment thereof, illustrated by way of non-limiting example.

The process comprises the following steps:
1. preparing the active paste composed of a mixture of lead, lead oxide, sulphuric acid, water and certain additives;
2. mixing the mixture in a mixing machine;
3. preparing a support, generally in the form of a lead grid;
4. disposing the active paste on the support by means of a spreader, to form a pasted support;
5. subjecting the plates to rapid drying treatment at a temperature between 100° C. and 200° C. for 15-30 seconds;
6. withdrawing the plate obtained in this manner and locating it in a controlled atmosphere environment for the ozone treatment step;
7. locating the plate in an environment at a temperature between 35° C. and 65° C. and a humidity of about 90% for the subsequent curing step, which lasts from 12 to 24 hours;
8. at the end of curing, the plate becomes the electrode ready to be disposed in a battery cell.

According to the present invention, the aforedescribed treatment is to be applied preferably to positive plates, however if also applied to the negative plates the production time is reduced, as the oxidation time is accelerated.

For the ozone treatment step a chamber of 0.7 $m^3$ volume was used, in which 120 plates were disposed on a suitable frame. The chamber is hermetically sealed and an ozone-containing gas flow is fed in at a flow rate of 180 l/hour for 45 minutes.

The ozone quantity introduced is 1 g/hour, the flow being 26 liters per $m^2$ of treated plate surface per hour of gas and is equivalent to 858 mg of ozone per $m^2$ of surface per hour (26 liters per $m^2$ per hour×33 mg of ozone per liter).

The chamber temperature is controlled between 30° C. and 50° C., with a relative humidity greater than 80%.

The ozone quantity to be applied varies depending on the plate dimensions and consequently on the surface to be covered.

Either air or oxygen can be used as the gas. If air is used, the maximum ozone concentration is 3% by volume, whereas if oxygen is used the maximum ozone concentration is 6% by volume.

Plate curing results in complete effective oxidation of the plate lead. If this process step is omitted, good but lower plate efficiency is still obtained.

After treatment with this process, the pasted support surface is characterised by a different crystal morphology. The chemical composition shown by analytical analysis shows only small differences from supports produced by traditional technology. As shown in Table 1, with the present method $PbO_2$ (lead dioxide) is not present, but instead a group of elements.

It has also been found that there is no conductivity on the plates obtained, or more precisely the conductivity has remained unaltered from that which previously existed. In this respect, as $PbO_2$ (which is conductive) is not formed, there is no conductivity.

The analyses were carried out with an X-ray diffractometer, and show the elements found on plates treated with ozone and on plates of normal production.

TABLE 1

| | Tribasic $(PbO)_3(Pb(SO_4))(H_2O)$ | Pb | Hydrocerussite $2(PbCO_3)*(Pb(OH)_2)$ | α-PbO | β-PbO | $Pb_3O_4$ |
|---|---|---|---|---|---|---|
| Supports treated with ozone Example 1 | 50.46 | 0.15 | 16.71 | 12.46 | 15.85 | 4.38 |
| Supports treated with ozone Example 2 | 52.66 | 0.07 | 16.3 | 18.27 | 9.06 | 3.64 |
| Reference support Example 3 | 41.53 | 0.07 | 15.61 | 12.91 | 25.17 | 4.70 |
| Reference support Example 4 | 46.60 | 0.02 | 14.99 | 13.00 | 19.64 | 5.75 |

Following the treatment process, such electrodes or plates present the characteristic of a particular morphological structure of the surface crystals.

The crystallinity measurement, obtained by processing the X-ray diffractometer analysis for active support material both treated and untreated with ozone, does not show significant differences.

However, at the microscopic level the morphology of the crystals of the supports untreated by the present process presents a well defined crystalline structure with individual crystals with dimensions between 1 and 40 μm. In treated supports most of the surface shows much smaller crystals agglomerated together to form structures with dimensions which are a multiple of 10 μm, up to 70-80 μm.

The supports treated with ozone and subjected to curing, as described, showed particular properties and significant differences during the formation process and subsequent discharge tests compared with the normal reference electrodes.

The discharge test at different battery intensities for verifying the rated capacity is described in IEC standard 60896-21.

Table 2 compares the discharge test at 10 hours (C10) and at one hour (C1) for batteries of normal production (standard batteries) without any ozone treatment, batteries treated as in EP 228 647 (batteries treated with an ozone-containing gas flow exceeding 100 liters/m² per hour), and batteries treated in accordance with the present invention with a gas flow of 26 l/m² of treated plate surface per hour.

TABLE 2

| | C10 | C1 |
|---|---|---|
| Standard battery | 95% | 94% |
| Batteries treated with an ozone-containing gas flow exceeeding 100 l/m² per hour | 98% | 100% |
| Batteries treated in accordance with the present invention with an ozone-containing gas flow of 26 l/m² per hour | 101% | 104% |

In both tests it can be clearly seen that the use of less ozone-enriched gas than that taught in EP 228 647 surprisingly leads to an increased yield.

The positive reference electrodes were produced by the same production processes as those subjected to treatment. The negative electrodes were from the same production batch for all the assembled cells.

The test preparation and conditions for the assembled batteries were identical: a constant current box formation procedure was used.

During formation with an air-cooled process, those cells containing positive electrodes in the form: of the ozone-treated supports as previously described showed the following advantages:

a lower cell temperature during formation (from 3° to 8° C.) compared with the reference cells;
a lower internal resistance during the initial formation step;
a more rapid formation process (attainment of polarization from 2 to 5 is hours earlier);
a greater water loss during formation as the result of a quicker process and the fact that the cells remain in a polarization state for a longer period;
a higher voltage on termination of the discharge test during formation.

The cells produced, with or without treated supports, showed significant differences in terms of capacity:

as the result of their complete formation, the cells with the described positive electrodes treated with ozone show from 5 to 10% more capacity in discharge tests (10 hours at 1.8 V discharge). The superior capacity performance was tested and confirmed even after three discharge tests in sequence after numerous weeks in a charge state;
the cells with the positive electrodes formed from the supports treated with ozone show better performance in a subsequent one hour discharge test, with a capacity up to 10% higher than the reference cells.

The advantages can be summarized as follows:
a reduction in the energy used for curing and formation of the treated supports;
an increase in the available current capacity during the discharge test at high and low ratio ($C_1$ and $C_{10}$).

The invention claimed is:

1. A method for producing a lead battery electrode comprising the steps of:
   (i) depositing of an active paste on a support to form an electrode;

(ii) placing said electrode in a controlled atmosphere environment at a temperature between 30° C. and 50° C. and a relative humidity greater than 80% and treating said electrode with an ozone-enriched gas at a flow rate less than 100 liters per hour for each square meter of the electrode, (iii) curing said treated electrode in an environment comprising a temperature between 35° and 65° C. and a humidity of about 90% for a time between 12 to 24 hours, wherein the treatment with said ozone-enriched gas is at a flow rate effective to enhance a capacity of the electrode and the method does not result in formation of lead dioxide on the electrode.

2. A method as claimed in claim 1, wherein said gas is enriched with an ozone quantity between 1% and 3% by volume.

3. A method as claimed in claim 1, wherein said gas is enriched with an ozone quantity between 3% and 6% by volume.

4. A method as claimed in 1, wherein said gas is enriched with an ozone quantity of 3% by volume.

5. A method as claimed in claim 1, wherein said gas is air.

6. A method as claimed in claim 1, wherein said gas is oxygen.

7. A method as claimed in claim 1, wherein said electrode is exposed to an ozone-enriched gas of flow rate less than 50 liters per hour for each square meter of surface of said electrode.

8. A method as claimed in claim 1, wherein the electrode is treated with the ozone-enriched gas at a flow rate of 26 liters per hour for each square meter of the electrode.

* * * * *